Figure 1:
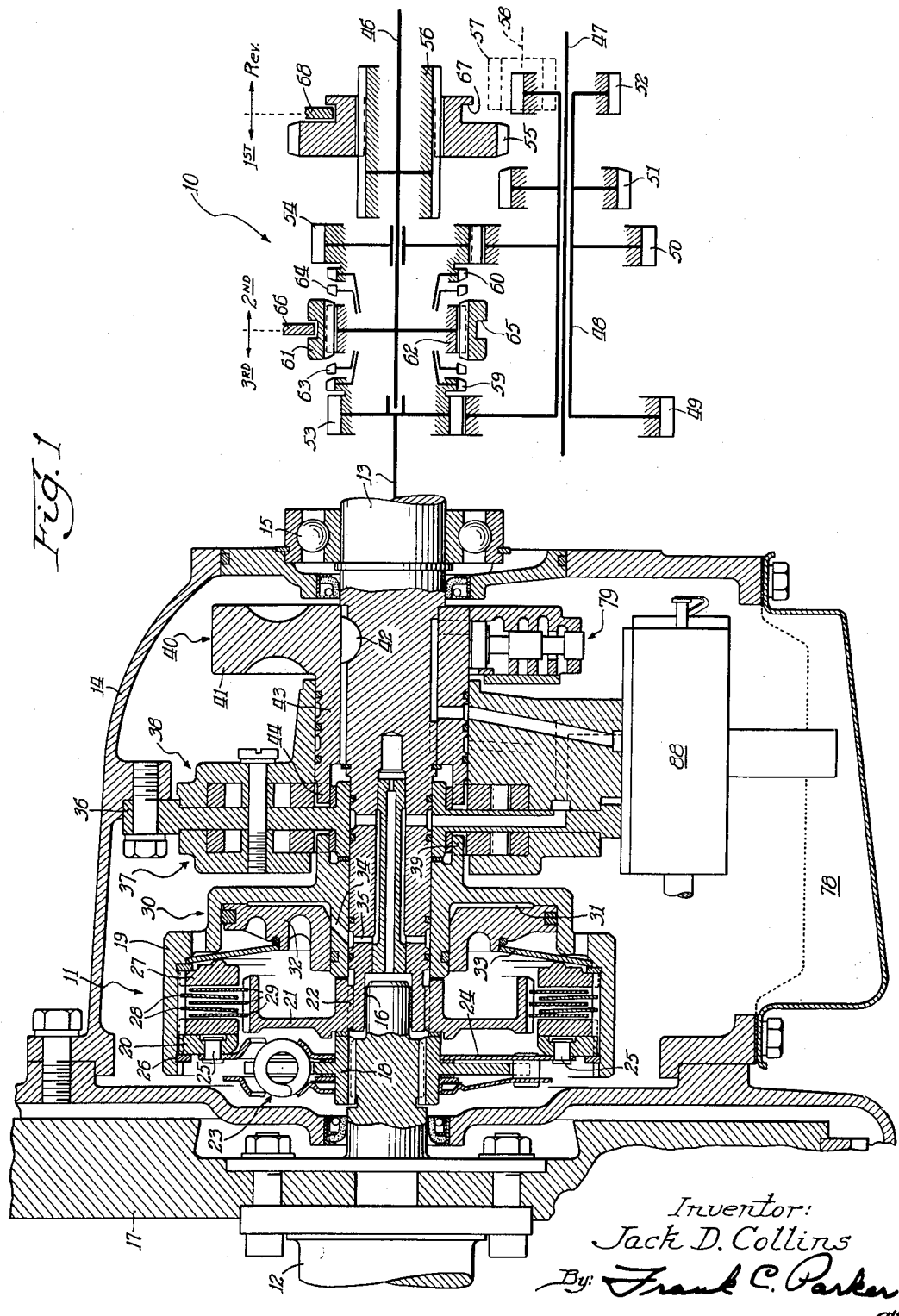

United States Patent Office 2,756,851
Patented July 31, 1956

2,756,851

CLUTCH CONTROL SYSTEM

Jack D. Collins, Muncie, Ind., assignor to Borg-Warner Corporation, Chicago, Ill., a corporation of Illinois Application October 22, 1952, Serial No. 316,184

20 Claims. (Cl. 192—.052)

The present invention relates in general to automotive vehicle transmissions and more particularly to hydraulic systems for controlling the main clutch between the vehicle driving engine and transmission.

The primary object of the present invention is to provide a hydraulic system for controlling the engagement and disengagement of a friction clutch disposed between the driving engine of an automotive vehicle and the transmission thereof, which system is capable of effecting clutch engagement and disengagement automatically and with substantially the same response as when the conventional main friction clutch disposed between an automotive vehicle driving engine and transmission is operated by a skilled driver.

A further object of the present invention is to provide a hydraulic clutch control system which may be disposed in substantially the same space in the transmission housing as the conventional foot operated clutch control mechanism and which eliminates the necessity of providing the conventional foot operated clutch pedal.

A further object of the present invention is to provide a manual control for a hydraulic clutch control system which comprises a manually operable electric switch disposed in the end of the conventional ratio selector lever, which switch is normally open and which is operable at the will of the driver to effect movement of a solenoid operated valve so as to rapidly effect clutch disengagement.

A further object of the present invention is to provide a hydraulic system for controlling the engagement and disengagement of a main vehicle clutch disposed between the driving engine and transmission, including means for effecting fast operation of the clutch engaging motor until the clutch is partially engaged and thereafter effecting relatively slow operation of the clutch engaging motor in order to provide a gradual full engagement of the clutch.

A further object of the present invention is to provide a hydraulic clutch control system for an automotive vehicle wherein the conventional accelerator pedal for the vehicle is so linked with the control system that movement of the accelerator pedal from an idling position to a partially open throttle position, when starting the vehicle from a stationary condition, is effective to establish a fluid circuit for effecting clutch engagement.

A further object of the present invention is to provide a hydraulic clutch control system for the main friction clutch in an automotive vehicle wherein the force of engagement of the clutch is regulated in response to both the speed of the vehicle engine and the position of the vehicle accelerator pedal.

A still further object of the present invention is to provide speed responsive control valve means normally effective to prevent disengagement of the main vehicle clutch above a predetermined speed of the vehicle, but which means is capable of being overruled at the will of the operator when it is desired to effect a change in the speed ratio through the transmission of the vehicle.

A still further object of the present invention is to provide a hydraulic system for effecting engagement of the main clutch of an automotive vehicle including means effective above a predetermined speed of the vehicle for effecting clutch engagement when the main driving engine is inoperative in order to start the vehicle engine by pushing the vehicle.

Figure 2:
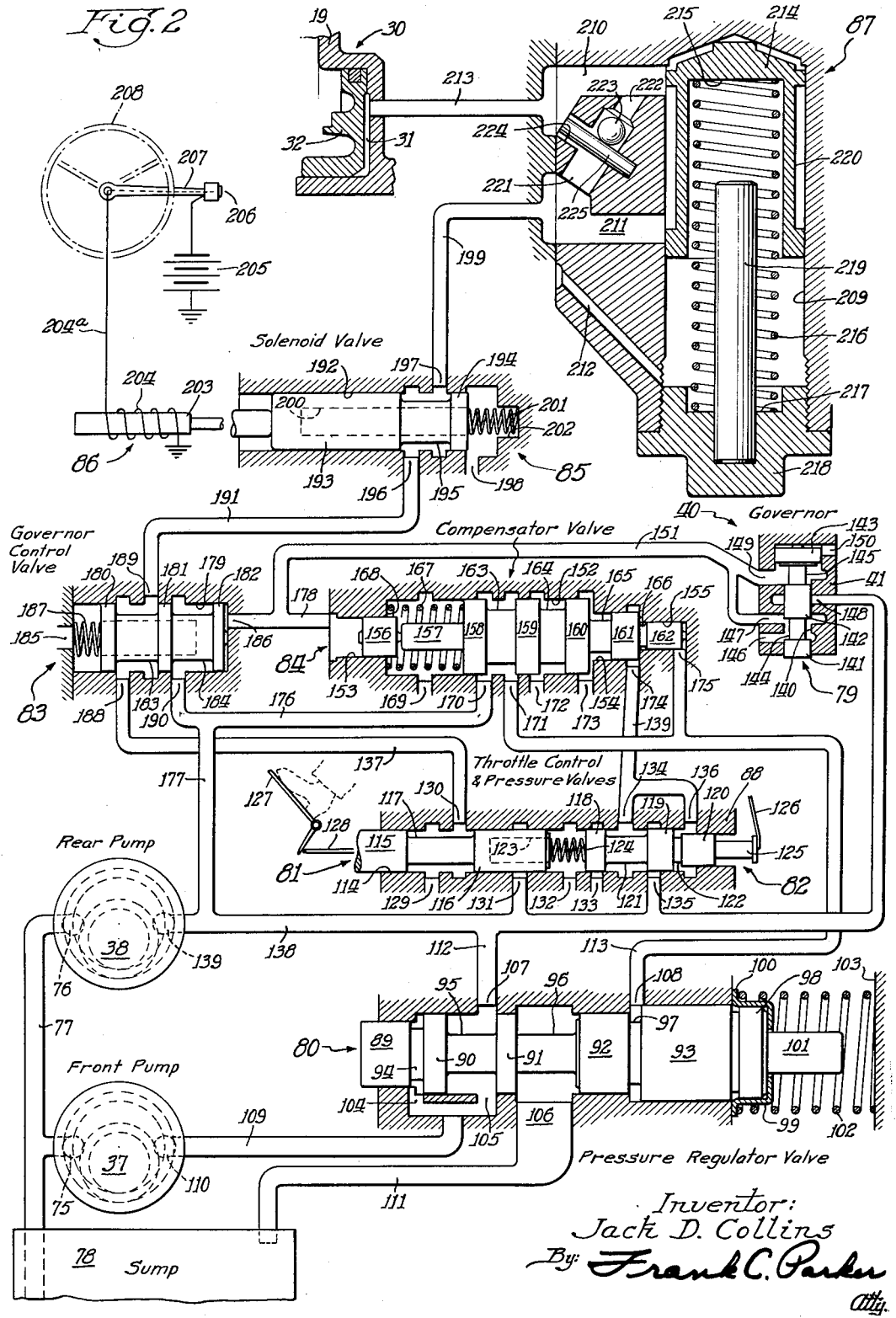

The above and numerous other objects and numerous advantages of the present invention will become apparent from the following detailed description when read in conjunction with the accompanying drawings which form a part of the present specification, wherein:

Fig. 1 is a side elevation view, shown partly in section, and showing the friction clutch, fluid pump and governor in detail, and further showing a conventional transmission with which the present invention may be associated; and Fig. 2 is a schematic hydraulic diagram showing the principal features of the control system of the present invention.

With reference to the drawings, wherein like reference numerals have been utilized in the different views to identify identical parts, and with particular reference to Fig. 1 of the drawing, the hydraulic control system comprising the subject matter of the present invention is adapted to be associated with a conventional change speed transmission, illustrated generally by reference numeral 10. The control system of the present invention is adapted to control the engagement and disengagement of a friction clutch, indicated generally by reference numeral 11, which clutch 11 is disposed between a main drive shaft 12, which may be driven directly by the engine (not shown) of the vehicle, and a transmission input shaft 13. The transmission 10 and clutch 11 are both suitably disposed in a stationary transmission casing 14, with the shaft 13 being rotatably mounted in the casing 14 by means of ball bearings 15. The main drive shaft 12 is piloted within the end of the transmission input shaft 13, as indicated at 16. The drive shaft 12 is provided with a fly wheel 17, securely bolted thereto and has a hub 18 splined thereto.

The clutch 11 comprises a driving member consisting of an annular drum-like element 19, suitably journalled for rotation with respect to the transmission input shaft 13, and a reaction plate 20 splined to the annular member 19. The clutch 11 also includes a driven element 21 which is splined, as illustrated at 22, to the transmission input shaft 13. The hub 18 which is splined to the shaft 12, is connected to the reaction member 20 of the clutch 11 by means of a vibration dampener 23 and a disc 24 secured to the reaction member 20 by means of a plurality of rivets 25.

The reaction member 20 of the clutch 11 is prevented from moving axially with respect to the annular member 19 by means of a split ring 26. Also splined to the annular member 19 is a pressure plate 27 and a plurality of driving clutch discs 28. The pressure plate 27 is movable axially to the left, as viewed in Fig. 1, in order to frictionally engage the clutch discs 28 with the interleaved driven clutch discs 29 splined to the driven element 21 of the clutch 11.

A fluid pressure operated motor 30 is provided for effecting engagement of the clutch discs 28 and 29 and comprises an annular cylinder 31, formed in the driving element 19, and having an annular reciprocable piston 32 disposed therein. The piston 32, when moved to the left as viewed in Fig. 1, effects engagement of the clutch 11 through the medium of a Belleville washer 33 which is pivotally disposed at its outer periphery within a suitable peripheral notch formed in the annular member 19. The piston 32, as shown, acts against the inner periphery of the Belleville washer 33, causing the washer 33 to function as a lever and thereby move the pressure plate 27 to the left in order to effect engagement between the clutch discs 28 and 29. Movement of the piston 32 within the annular cylinder 31 is caused by admitting fluid under pressure into the cylinder 31 behind the piston 32 through suitable ports, such as ports 34 and 35 respectively formed in the annular member 19 and the shaft 13.

A laterally disposed plate 36, suitably secured to the transmission casing 14, is provided for mounting an engine driven fluid pump 37 and a rear pump 38 driven by the transmission input shaft 13. Each of the pumps 37 and 38 comprises a pair of gears and the engine driven pump 37 is driven by means of axially extending teeth 39, on the member 19, which form a positive driving connection with one of the gears of the pump 37.

A governor 40, which will be described more completely in connection with the description of the hydraulic circuit diagram shown in Fig. 2, comprises an annular member 41 which is keyed at 42 so that it rotates in unison with the transmission input shaft 13. The governor member 41 has an axially extending portion 43 provided with a plurality of teeth 44 forming a positive driving connection with the input gear of the rear pump 38.

The transmission 10 includes, besides the shaft 13, a driven shaft 46, adapted to drive the rear wheels of the vehicle, and a countershaft 47. Rotatably mounted on the countershaft 47 is a concentric sleeve shaft 48 having a plurality of gears 49, 50, 51 and 52 secured thereto. The gear 49 is adapted to continuously mesh with a gear 53 secured to the transmission input shaft 13, the gear 50 is adapted to continuously mesh with a gear 54 rotatably mounted on the transmission driven shaft 46 and the gear 51 is adapted to mesh with a slidably gear 55 slidably splined on a hub 56 secured to the transmission driven shaft 46. The slidable gear 55 is movable to the right so as to meshingly engage a gear 57 rotatably mounted on a second countershaft 58 in order to provide reverse drive. The gear 52 continuously meshes with the gear 57.

The gears 53 and 54 are respectively provided with positive clutch teeth 59 and 60, and a clutch collar 61, slidably splined on a hub 62 secured to the shaft 46, is shiftable either to the left or to the right in order to positively engage either set of teeth 59 or 60. Respectively disposed between the teeth 59 and the hub 62 and the hub 62 and the teeth 60 are a pair of synchronizer rings 63 and 64. The clutch collar 61 is provided with a peripheral groove 65 adapted to receive a shift fork 66 for shifting the collar and effecting clutching engagement of the shift collar 61 with either of the gears 53 and 54. The slidable gear 55 is provided with a peripheral groove 67 for receiving a shift fork 66 for enabling shifting movement of the gear 55 to bring it into mesh with either the gear 51 or the gear 57.

The transmission 10 provides three forward driving ratios, including a direct drive, between the shafts 13 and 46, and a single reverse drive. Reverse drive between the shafts 13 and 46 is completed by moving the gear 55 to the right into meshing engagement with the gear 57 while the clutch collar 61 occupies its neutral position as shown. A low forward speed drive through the transmission 10 is established by moving the gear 55 to the left into meshing engagement with the gear 51 while the clutch collar 61 occupies its neutral position as shown. Second or intermediate speed forward drive through the transmission 10 may be established by moving the clutch collar 61 to the right into clutching engagement with the teeth 60 on the gear 54 while the gear 55 occupies its neutral position as shown. High speed forward drive or direct drive through the transmission 10 may be established by moving the clutch collar 61 to the left into clutching engagement with the teeth 59 on the gear 53 while the gear 55 occupies its neutral position as shown.

With particular attention to Fig. 2 of the drawings which shows the hydraulic system for controlling the engagement and disengagement of the clutch 11, it will be noted that the pumps 37 and 38 are respectively provided with inlet ports 75 and 76 which communicate with a conduit 77 leading to a sump 78 containing a supply of oil. The control system includes a governor valve 79 which is radially reciprocable within the annular member 41 of the governor 40, a reciprocable pressure regulator valve 80, a throttle control valve 81, a throttle pressure valve 82, a governor control valve 83, a compensator valve 84, and a solenoid valve 85 adapted to be controlled by means of a solenoid 86. The control system also includes a regulator 87 for effecting high speed movement of the clutch actuating piston 32 until the clutch reaches partial engagement and for effecting relatively slower movement of the piston 32 after the clutch is partially engaged and until it reaches full engagement. Each of the valves 80, 81, 82, 83, 84 and 85 is reciprocable within suitable openings provided in a valve casing 88.

The pressure regulator valve 80 comprises a plurality of lands 89, 90, 91, 92 and 93 which are respectively separated from each other by means of grooves 94, 95, 96 and 97. The valve 80 is shown in its leftward position and also includes another land 98 which is received within an annular member 99 formed with a flange 100 thereon. Protruding from the land 98 is an axially extending projection 101 which is effective, when the valve 80 is moved in opposition to the force of a compression spring 102, to strike a wall 103 and thereby prevent further movement of the valve 80 in opposition to the spring 102. The opening in the valve casing 88 within which the valve 80 is received is provided with a plurality of ports 104, 105, 106, 107 and 108. Both ports 104 and 105 communicate with a conduit 109 which is in communication with a fluid pressure output port 110 of the front pump 37. The port 106 is in communication with a conduit 111 leading to the sump 78. The port 107 communicates with a conduit 112 and the port 108 communicates with a conduit 113.

The throttle control valve 81 and the throttle pressure valve 82 are both reciprocable within an annular opening 114 formed in the valve casing 88. The throttle control valve 81 comprises two lands 115 and 116 which are separated from each other by means of a groove 117. The throttle pressure valve 82 comprises three lands 118, 119 and 120 which are separated from each other by means of a pair of grooves 121 and 122. An axially extending opening 123 in the end of the throttle control valve 81 receives a compression spring 124 therein and the other end of the compression spring 124 abuts the left face of the land 118 of the throttle pressure valve 82. The throttle pressure valve 82 is formed with an outwardly extending projection 125 and a leaf spring 126 secured to the casing 88 continuously biases the throttle pressure valve to the left, the force exerted by the leaf spring 126 being relatively slight. The throttle control valve 81 is connected to a conventional accelerator pedal 127 by means of suitable linkage, indicated schematically by a rod 128.

The opening 114 in the valve casing 88 within which the throttle control valve 81 and the throttle pressure valve 82 are received is provided with a plurality of annular grooves which respectively communicate with a bleed port 129, a port 130, a port 131, a pair of bleed ports 132 and 133, a port 134, a port 135 and a port 136. The port 130 is in communication with a conduit 137. The port 131 communicates with a conduit 138 leading from an output port 139 of the rear pump 38. The port 135 is also in communication with the conduit 138 leading from the output port 139 of the rear pump 38 and both ports 134 and 136 are in communication with a conduit 139.

It will be noted that the throttle control valve 81 and the throttle pressure valve 82 are acted upon by two external forces, namely, the force provided by the pressure of the vehicle accelerator pedal 127 and the force provided by the biasing effect of the leaf spring 126. The pressure of the accelerator pedal 127 causes the throttle control valve 81 to move to the right and the force acting on the throttle control valve 81 tending to move it in this direction is transferred to the throttle pressure valve through the medium of the compression spring 124.

The governor valve 79 is reciprocable within a suitable opening 140 provided in the annular member 41 and comprises three lands 141, 142, and 143 which are respectively separated from each other by means of a pair of grooves 144 and 145. The opening 140 in the annular member 41 is provided with a plurality of annular grooves which respectively communicate with a bleed port 146, a port 147, a port 148 and a port 149. The inner end of the opening 140 communicates with a bleed port 150. The port 148 communicates with the conduit 138 leading from the output port 139 of the rear pump 38 and the ports 147 and 149 each communicate with a conduit 151.

The compensator valve 84 is reciprocable within an opening 152 formed in the valve casing 88, said opening 152 being provided with reduced portions 153, 154 and 155. The compensator valve 84 comprises a reciprocable piston element 156 which is longitudinally slidable within the reduced portion 153, a projecting portion 157, and a plurality of lands 158, 159, 160, 161 and 162 which are respectively separated from each other by means of grooves 163, 164, 165 and 166. A compression spring 167 disposed within the opening 152 acts between an annular face 168 and one side of the land 158 so as to continuously bias the compensator valve 84 to the right. The opening within which the compressor valve 84 is disposed is provided with a plurality of annular grooves which respectively communicate with a bled port 169, a port 170, a port 171, a pair of bleed ports 172 and 173, a port 174 and a port 175. The port 170 communicates with a conduit 176 which communicates with the conduit 138 through a conduit 177. The ports 171 and 175 are both in communication with the conduit 113 and the port 174 is in communication with the conduit 139. Fluid under pressure in the conduit 151 acts against the left end of the piston 156 through a conduit 178.

The governor control valve 83 is reciprocably disposed within an opening 179 formed in the valve casing 88 and the governor control valve 83 comprises three lands 180, 181 and 182 which are respectively separated from each other by means of a pair of grooves 183 and 184. The left end of the opening 179 is provided with a bleed port 185. The right end of the opening 179 is provided with a port 186 which communicates with the conduit 151. Pressure in the conduit 151 acting on the right face of the land 182 urges the governor control valve to the left in opposition to the bias of a compression spring 187 disposed between the left end of the land 180 and the left end of the opening 179. The opening 179 is provided with a plurality of annular grooves which respectively communicate with ports 188, 189 and 190. The port 188 communicates with the conduit 137, the port 189 is in communication with a conduit 191 and the port 190 communicates with the output port 139 of the rear pump 38 through the conduits 176, 177 and 138.

The solenoid controlled valve 85 is reciprocably disposed within an opening 192 formed in the valve casing 88 and comprises two lands 193 and 194 separated by means of a groove 195. The opening 192 in the valve casing 88 which receives the solenoid valve 85 is provided with a port 196, a port 197 and a bleed port 198. The port 196 communicates with the conduit 191 and the port 197 communicates with a conduit 199. The valve 85 is provided with a central opening or aperture 200 extending relatively deep into the valve and a compression spring 201 is disposed within the opening 200, with the other end of the spring being seated within an opening 202 formed in the valve casing 88. The compression spring 201 functions at all times to bias the solenoid valve 85 to the left.

The solenoid 86 comprises a reciprocable armature 203 which is operable in response to energization of the solenoid winding 204 for moving the solenoid valve 85 to the right in opposition to the bias of the spring 201. An energizing circuit for the solenoid 86 includes a battery 205, a normally open spring biased push-button switch 206 disposed in the end of a conventional selector lever 207 adapted to be mounted immediately beneath the conventional steering wheel 208 of the automotive vehicle. The switch 206 is connected to the winding 204 of the solenoid 86 by means of a lead 204a. It is therefore apparent that upon depression of the push-button switch 206 in order to close this switch, an energizing circuit is completed for the solenoid 86. When the solenoid 86 is energized the armature 203 thereof moves to the right against the bias of the spring 201 in order to establish fluid communication between ports 197 and 198.

The regulator 87, which is effective to permit rapid movement of the clutch engaging piston 32 until the clutch 11 becomes partially engaged and to permit only relatively slow movement of the piston 32 from this point until the clutch 11 becomes fully engaged, includes a cylinder 209 having three conduits 210, 211 and 212 in communication therewith. The conduit 210 is also in communication with a conduit 213, while the conduit 211 communicates with the conduit 199 and the conduit 212 comprises a bleed conduit. Disposed within a reciprocable within the cylinder 209 is a piston 214 having a central opening 215 therein for receiving a compression spring 216. The compression spring 216 is seated at its lower end within an opening 217 formed in a cap 218 threaded into the cylinder 209. An abutment rod 219 mounted in the cap 218 limits downward movement of the piston 214 within the cylinder 209. The piston 214 is provided with an annular groove 220 and when the piston 214 occupies the position shown, fluid communication between the conduits 211 and 210 is maintained through the groove 220. When the fluid pressure in the conduit 210 increases to a predetermined value, this fluid pressure acts on the upper end of the piston 214, urging it downwardly, in opposition to the bias of the spring 216 and thereby breaks this fluid path between the conduits 211 and 210.

An opening 221 formed in the cylinder casing communicates directly with the conduit 211 and this opening 221 also communicates with the conduit 210 through a port 222 which is adapted to be closed by a ball check valve 223 whenever the pressure in the conduit 211 is greater than in the conduit 210. The opening 221 is also in communication with the conduit 210 through a port 224, the size of this latter opening being restricted by means of a pin 225 which extends thereinto. The pin 225 also serves to hold the ball 223 in the upper end of the opening 221 so that it will be in the proper position in order to close the port 222 whenever the pressure in the conduit 211 increases to a value greater than the pressure in the conduit 210.

Whenever the solenoid 86 is energized by the closure of the push-button switch 206, the solenoid valve 85 is moved to the right in order to establish fluid communication between the conduit 199 and the bleed port 198. Under these conditions the fluid pressure in the conduit 211 is relieved and the ball check valve 223 immediately releases, thereby permitting a rapid flow of fluid from the cylinder 31 through the conduits 213 and 210, through the port 222, opening 221 and conduits 211 and 199, to the bleed port 198. This is very effective in causing rapid disengagement of the clutch 11 whenever the push-button switch 206 is closed by the operator of the vehicle.

The operation of the hydraulic clutch control system forming the subject matter of the present invention will now be described. When it is desired to start the vehicle engine, the transmission mechanism 10 is conditioned for neutral and upon the subsequent starting of the vehicle engine, the operator thereof will allow it to idle at least for a few moments. Under these conditions, the accelerator 127 occupies its idling position so that the throttle control valve 81 and the throttle pressure valve 82 assume the respective positions shown in Fig. 2 of the drawings. The front pump 37, being driven directly with the engine of the vehicle, functions and establishes a supply of fluid pressure in the conduit 109. Fluid pressure is thereby provided in the ports 104 and 105 and in the port 107 which, in turn, supply fluid under pressure to the conduits 112, 138, 177 and 176.

The lands 181 and 182 of the governor control valve 83 are of equal diameter and therefore fluid communication to the conduit 191 may not be obtained. The port 131 is blocked by the land 116 of the throttle control valve 81, the port 135 is blocked by the land 119 of the throttle pressure valve 82 and the port 148 of the governor valve 79 is blocked by the land 142. The pressure in the conduits 109, 112, 138, 177 and 176 therefore builds up gradually and the fluid acting between the lands 89 and 90 of the regulator valve 80 tends to move the regulator valve to the right. The fluid pressure in the conduit 176 communicates with the conduit 113 through the ports 170 and 171 and groove 163 of the compensator valve. This causes fluid under pressure to be admitted into the port 108 through the conduit 113 and this fluid pressure acts between the lands 92 and 93 of the pressure regulator valve 80. It will therefore be apparent that there are two forces, namely, the differential fluid pressure force acting on the land 90 and the differential fluid pressure force acting on the land 93 of the pressure regulator valve 80, tending to move this valve to the right in opposition to the bias of the compression spring 102. When the fluid pressure supplied by the front pump 37 increases to a predetermined value, the forces acting on the lands 90 and 93 will be sufficient to cause the valve 80 to move sufficiently to the right to establish fluid communication between the groove 95 and the port 106. Such communication prevents any further build-up of fluid pressure and serves to maintain the fluid pressure supplied by the front pump 37 at a regulated maximum value.

Due to the fact that the governor control valve 83 is in the position shown, there is no fluid communication to the motor 32 and thus the clutch 11 is disengaged. The rear pump 38, it will be recalled, is only driven whenever the clutch 11 is engaged and therefore the rear pump 38 does not function to supply any fluid pressure while the vehicle engine idles.

The operator of the vehicle will then move the selector lever 207 into a position to establish either low or reverse drives through the transmission. He subsequently depresses the accelerator pedal 127 and upon such depression, to a relatively slight extent, the throttle control valve 81 is moved to the right sufficiently to uncover the port 131. The compression spring 124 functions at this time to move the throttle pressure valve 82 to the right also. This movement of the throttle pressure valve 82 causes the land 119 to uncover the port 135.

The uncovering of the port 131 by displacement of the land 116 establishes fluid pressure communication between the conduits 112 and 137. The conduit 137 is then in communication with the conduit 191 through the ports 188 and 189 and groove 183. The conduit 191 is in communication with the conduit 199 through the ports 196 and 197 and the groove 195 and fluid pressure is therefore provided in the conduit 211. This fluid pressure is extended to the conduits 210 and 213 through the groove 220 in the piston 214 and effects movement of the piston 32 to the left in order to start to engage the clutch 11. Engagement of the clutch 11 to its partially engaged position is quite rapid due to the functioning of the regulator 87 and full engagement of the clutch 11 from a partially engaged condition is quite gradual.

The movement of the throttle pressure valve 82 to the right in order to uncover the port 135 establishes fluid communication between the ports 135 and 134 through the groove 121 of the throttle pressure valve 82. Fluid under pressure is therefore applied to the right face of the land 119 of the throttle pressure valve 82 through the port 136 and limits the movement of the throttle pressure valve to the right.

It will be recalled that fluid under pressure exists in the conduit 113 at this time and this pressure may be termed a compensator pressure which acts on the right face of the land 162 of the compensator valve 84, thereby tending to move this valve to the left slightly so as to partially block the port 171. Slight displacement of the compensator valve 84 to the left partially uncovers the port 174, and throttle pressure in the conduit 139 is applied between the right face of the land 161 and left face of the land 162 of the compensator valve 84. Throttle pressure therefore also tends to move the compensator valve further to the left. This movement of the compensator valve 84 to the left tends to close or move the land 159 toward a closed position with respect to the port 171 so that compensator pressure in the conduit 113 is decreased somewhat and the force acting on the land 93 of the pressure regulator valve 80 tending to move this valve to the right is decreased. This is effective to cause an increase in the fluid pressure supplied to the conduit 112. It will therefore be apparent that as the accelerator pedal 127 is depressed the compensator pressure decreases and this, in turn, causes the pressure regulator valve 80 to function so as to increase the pump pressure maintained in the conduit 112.

Upon engagement of the clutch 11, the governor 40 starts to rotate and centrifugal force resulting from the rotation of the governor 40 urges the governor valve 79 radially outwardly so as to tend to move the land 142 thereof to a position wherein the port 148 is opened slightly. It will be noted that the land 143 is larger than the land 142 and any fluid pressure passing through the port 148, groove 145 and the port 149 acts differentially on the valve 79, tending to urge the valve radially inwardly in opposition to the centrifugal force. As the governor rotates at increasing speeds the centrifugal force is greater and accordingly, governor pressure which is provided in the conduit 151 increases with increasing speeds of the governor. The governor pressure in the conduit 151 is applied to the left end of the piston 156 and to the right end of the governor control valve 83.

The governor pressure applied to the left end of the piston 156 is effective to bias the compensator valve 84 to the right in opposition to throttle pressure which acts on the right face of the land 161. Accordingly, compensator pressure, which is applied through the conduit 113 to the land 93 of the pressure regulator valve, actually comprises a fluid pressure which is regulated in accordance with the position of the accelerator pedal 127 and the speed of the transmission input shaft 13. Also, due to this fact, pump pressure applied through the conduits 112 and 177, for effecting engagement of the clutch 11, is controlled and regulated in accordance with the degree of depression of the accelerator pedal and the speed of rotation of the shaft 13.

When the governor pressure in the conduit 151 increases to a predetermined value, for example, to the value thereof upon rotation of the governor 40 at a speed corresponding to a speed of 12 M. P. H. of the driving wheels of the vehicle, for example, the governor pressure is sufficiently high to overcome the bias of the spring 187 and under these conditions the governor control valve 83 is moved to the left in order to establish fluid communication between the ports 190 and 189. At such speed of the vehicle, it is therefore apparent that the fluid pressure supplied by the pump 38 functions to maintain the clutch 11 engaged even though the operator of the vehicle releases the accelerator pedal 127 to its idling position. Thus, at all vehicle speeds above a predetermined value, for example 12 M. P. H., there is a positive driving connection between the driving engine of the vehicle and the driving wheels thereof.

It will be recalled that the pump pressure maintained in conduit 112 varies slightly with changes in compensator pressure in line 113. It will also be recalled that an increase in throttle pressure in line 139 and port 174 causes the compensator valve 84 to move to the left so as to bring the land 159 into closing relation with respect to port 171. The closing of port 171 by the movement of land 159 to the left has the effect of decreasing the compensator pressure in line 113 so that the spring 102 can hold the valve 80 further to the left and, in turn, effect an increase in the pump pressure in line 112.

As the speed of rotation of the governor 40 increases, governor pressure in line 151 and acting on the left end of the valve 84 increases. This tends to move the valve 84 to the right so as to move the land 159 in a manner which opens port 171. This has the effect of increasing the compensator pressure in line 113, which, in turn, provides an additional force tending to move the valve 80 to the right. This movement of the valve 80 to the right has the effect of providing a lower regulated pump pressure in line 112, which pressure is the same as that which is applied to the clutch motor 30.

It is therefore apparent that the clutch engaging fluid pressure increases with accelerator depression and decreases as the speed of the governor 40 or vehicle increases.

Due to the fact that the governor control valve 83 remains in the position shown in Fig. 2 of the drawings at a speed below a predetermined value, 12 M. P. H., for example, whenever the vehicle is travelling at such lower speeds, release of the accelerator pedal 127 to its idling position causes the clutch 11 to be disengaged, the fluid in the cylinder 31 being drained under these conditions through the conduits 213, 199, 191 and 137 and through the bleed port 129. Accordingly, above a predetermined speed of the vehicle, for example 12 M. P. H., a positive driving connection is at all times established between the driving and driven wheels of the vehicle and below this same speed the vehicle free wheels.

Whenever the operator of the vehicle desires to effect a ratio change in the transmission 10 he depresses the push button switch 206, thereby completing an electrical energizing circuit for the solenoid 86 and causing this solenoid to effect a shifting movement of the solenoid valve 85, moving it to the right against the bias of the spring 201. Under these conditions, the port 197 and the bleed port 198 are interconnected and fluid from the cylinder 31 is rapidly drained, thereby effecting a very rapid disengagement of the clutch 11. It will be recalled that when fluid pressure in the conduit 199 is relieved, the ball check valve 223 moves into the position shown in Fig. 2 and thereby allows a rapid flow of fluid through the port 222 and out through the conduit 199 to the bleed port 198.

Upon disengagement of the clutch 11, the operator of the vehicle may then move the selector lever 207 to a different position in order to establish the desired driving ratio through the transmission. During normal gear changing operations, the operator of the vehicle will release the accelerator pedal 127 and upon a subsequent release of the switch 206 the clutch 11 will not again be reengaged until a subsequent depression of the accelerator pedal. It will, of course, be remembered that these conditions will prevail only when the vehicle is travelling at a speed below 12 M. P. H. for example, the speed above which governor pressure is sufficient to move the governor control valve to its leftward position. Therefore, if the vehicle is operating below the speed of 12 M. P. H., reengagement of the clutch 11 will not take place until a subsequent depression of the accelerator pedal 127 so as to effect fluid pressure communication between the ports 131 and 130. If the vehicle is travelling above the 12 M. P. H. speed, it will be apparent that the governor control valve 83 will be in its leftward position and as soon as the switch 206 is opened by release of the switch, engagement of the clutch 11 will immediately take place.

Whenever it is desired to start the vehicle by pushing it, the operator moves the selector lever 207 to the desired position. This will complete a power train from the driving wheels of the vehicle to the shaft 13, so that the rear pump 38 will be operative. The governor 40 is also operative when the vehicle is pushed in a forward direction, and when it reaches a speed of 12 M. P. H., the governor pressure in the conduit 151 will be sufficient to cause the governor control valve 83 to be moved to its leftward position. This effectively connects the ports 190 and 189 in order to establish a fluid pressure transmitting line from the rear pump 38 to the clutch operating motor 30. As the fluid pressure within the cylinder 31 builds up, the clutch 11 will gradually engage and the engine of the vehicle will be driven by the driving wheels thereof. As soon as the engine starts, the operator of the vehicle may control the same in the normal manner.

As is apparent from the foregoing description, the present invention provides an efficient clutch control system whereby engagement of the clutch is effected gradually and the force of engagement of the clutch is proportional to the speed of the vehicle and to the degree of depression of the accelerator pedal 127. Further, the need for a foot operated clutch pedal for controlling the clutch 11 has been eliminated. It is contemplated that numerous changes and modifications may be made in the invention without departing from the spirit or scope thereof.

What is claimed is:

1. In a control device for a clutch operatively disposed between the driving engine and transmission of an automotive vehicle, the combination of a fluid pressure actuated motor for effecting engagement of said clutch, a source of fluid pressure for operating said motor, an accelerator for the vehicle for controlling the driving engine, and valve means for controlling the supply of fluid from said fluid source to said motor, said valve means comprising a valve operatively connected with said accelerator and movable to an open position in response to depression of said accelerator to thereby connect said fluid source and said motor for effecting engagement of said clutch in response to accelerator depression, said valve means further including a second valve operable at the will of the operator of the vehicle for disconnecting said fluid source from said motor and for relieving the pressure in said motor for disengaging said clutch irrespective of the position of said accelerator.

2. In a control device for a clutch operatively disposed between the driving engine and change speed transmission of an automotive vehicle, the combination of a manually operable selector lever movable to different positions for selectively establishing different drives through said transmission, a motor for effecting engagement of said clutch, means providing a source of power for actuating said motor, means associated with said selector lever and operable at will for cutting off the power for said motor and releasing energy stored thereby for effecting disengagement of said clutch to facilitate the selection by movement of said selector lever of a different drive through said transmission, an accelerator for the vehicle for controlling the driving engine, and means connected with said accelerator and rendered operable upon depression thereof for connecting said power source with said motor to thereby effect engagement of said clutch.

3. In a control device for a clutch operatively disposed between the driving engine and change speed transmission of an automotive vehicle, the combination of a manually operable selector lever movable to different positions for selectively establishing different drives through said transmission, a fluid pressure operated motor for effecting engagement of said clutch, a source of fluid pressure for actuating said motor, a pair of valves operably disposed between said fluid pressure source and said motor for controlling the supply of fluid pressure to said motor and the engagement of said clutch, means associated with said selector lever and operable at will for actuating one of said valves to cut off the supply of fluid pressure for said motor and to relieve the fluid pressure in said motor for effecting disengagement of said clutch to facilitate the selection of a different drive through said transmission on a subsequent selective movement of said selector lever, an accelerator for the vehicle for controlling the driving engine, and means connecting the second one of said valves with said accelerator for connecting said fluid pressure source with said motor to effect engagement of said clutch upon depression of said accelerator.

4. The combination as set forth in claim 3 wherein the means associated with said selector lever and operable at will for actuating said one valve to cut off the supply of fluid pressure for said motor and to release the fluid pressure in said motor comprises a solenoid for controlling said one valve having an operating circuit including a control switch disposed in the end of the selector lever.

5. In combination, a friction cluch, a fluid pressure responsive device for effecting engagement of said clutch, a source of fluid pressure for actuating said device, means defining a fluid pressure supply conduit interconnecting said device and said fluid pressure source, a reciprocable valve operatively disposed in said conduit and movable between a first position for admitting fluid under pressure to said device and a second position for blocking the fluid pressure from said source and draining the fluid from said device, and other means operatively disposed in said conduit for initially permitting a high rate of fluid flow to said device after said valve is moved to its said first position to rapidly effect partial engagement of said clutch and thereafter permitting a relatively low rate of fluid flow to said device to gradually effect full engagement of said clutch.

6. In a device for controlling the rate of engagement of a friction clutch, the combination of a fluid pressure operated motor for engaging said clutch, a source of fluid pressure, a fluid pressure transmitting line connecting said source and said motor, and a regulating device disposed in said fluid pressure transmitting line for controlling the supply of fluid pressure to said motor to thereby control the rate of engagement of said clutch, said regulating device comprising a cylinder having a reciprocable piston disposed therein, means defining a peripheral fluid transmitting groove in said piston, means for biasing said piston in one direction for establishing fluid communication between said source and said motor through said groove, a pressure face on said piston adapted to have the fluid pressure supplied to said motor applied to said face for moving said piston in opposition to said biasing means so as to break the fluid communication between said source and motor through said groove, and means defining a restricted opening between said source and motor and disposed in parallel with said piston, whereby fluid supplied by said source initially flows through both said groove and said restricted opening to effect a relatively fast partial engagement of said clutch and after said piston moves in opposition to said biasing means the fluid flows only through said restricted opening to effect a gradual full engagement of said clutch.

7. A device for controlling the rate of engagement of a friction clutch as set forth in claim 6 wherein the regulating device also includes a check valve which opens automatically when the fluid pressure from said source is released for effecting the rapid discharge of fluid from said motor and a consequent fast disengagement of said clutch.

8. In a system for controlling the engagement and regulating the force of engagement of a fluid pressure engaged friction clutch disposed between a prime mover and a transmission, the combination of fluid pump means for providing a source of fluid pressure for engaging said clutch, a control for said prime mover and movable from an idle position toward an open throttle position for controlling the speed of said prime mover, a first valve actuated by said control upon movement thereof from said idle position to direct the fluid under pressure to said clutch to cause engagement of the clutch, a second valve actuated by said control for providing a second fluid pressure which varies in accordance with the position of said control, a third valve responsive to the speed of rotation of said prime mover for providing a third fluid pressure which varies in accordance with said speed, and means responsive to said second and third fluid pressures for varying the fluid pressure applied to said clutch for thereby controlling the force of engagement of said clutch in accordance with the position of said control and the speed of rotation of said prime mover.

9. In a system for controlling the engagement and regulating the force of engagement of a fluid pressure engaged friction clutch disposed between an automotive vehicle engine and the input shaft of a change speed transmission, the combination of fluid pump means for providing a source of fluid pressure for engaging said clutch, an accelerator for said engine depressible from an idle position toward an open throttle position for increasing the speed of said engine, a control valve actuated by said accelerator upon movement from its said idle position for directing fluid from said pump means to said clutch to cause engagement thereof, a throttle pressure valve controlled by said accelerator for providing a throttle pressure variable in accordance with the position of said accelerator, a governor valve responsive to the speed of rotation of said transmission input shaft for providing a governor pressure responsive to the speed of rotation of said shaft, and means responsive to said throttle pressure and said governor pressure for varying the fluid pressure applied to said clutch for thereby controlling the force of engagement of said clutch in accordance with the depression of said accelerator and the speed of rotation of said transmission input shaft.

10. In a system for controlling the engagement and regulating the force of engagement of a fluid pressure engaged friction clutch disposed between an automotive vehicle engine and the input shaft of a change speed transmission, the combination of fluid pump means for providing a source of fluid pressure for engaging said clutch, an accelerator for said engine depressible from an idle position toward an open throttle position for increasing the speed of said engine, a control valve actuated by said accelerator upon movement from its said idle position for directing fluid from said pump means to said clutch to cause engagement thereof, a throttle pressure valve controlled by said accelerator for providing a throttle pressure variable in accordance with the position of said accelerator, a governor valve responsive to the speed of rotation of said transmission input shaft for providing a governor pressure responsive to the speed of rotation of said shaft, and means including a compensator valve responsive to said governor pressure and said throttle pressure and effective to provide a compensator pressure for varying the fluid pressure applied to said clutch for thereby controlling the force of engagement of said clutch in accordance with the depression of said accelerator and the speed of rotation of said transmission input shaft.

11. In a system for controlling the engagement and regulating the force of engagement of a fluid pressure engaged friction clutch disposed between an automotive vehicle engine and the input shaft of a change speed transmission, the combination of fluid pump means for providing a source of fluid pressure for engaging said clutch, a regulator valve for limiting the pressure of the fluid applied for engaging said clutch, an accelerator for said engine and depressible from an idle position toward an open throttle position for increasing the speed of said engine, a control valve actuated by said accelerator upon movement from its said idle position for directing fluid from said pump means to said clutch to cause engagement thereof, a throttle pressure valve controlled by said accelerator for providing a throttle pressure variable in accordance with the position of said accelerator, a governor valve responsive to the speed of rotation of said transmission input shaft for providing a governor pressure responsive to the speed of rotation of said shaft, means including a compensator valve responsive to said governor pressure and said throttle pressure and effective to provide a compensator pressure variable in accordance with said governor pressure and said throttle pressure, and means for applying said compensator pressure to said regulator valve for causing the regulator valve to vary the fluid pressure applied to said clutch for thereby controlling the force of engagement of said clutch in accordance with the depression of said accelerator and the speed of rotation of said transmission input shaft.

12. In a system for controlling the engagement of a friction clutch adapted to connect a pair of relatively rotatable members, the combination of a fluid pressure actuated motor for engaging said clutch, a pump driven by one of said members for supplying a fluid pressure for actuating said motor, a fluid transmitting line connecting said pump and motor, a first valve normally biased to a position blocking fluid flow from said pump to said motor, a second valve normally biased to a position blocking fluid flow from said pump to said motor, depressible means controlling said first valve for shifting the first valve to a different position for connecting said pump and motor, and a governor responsive to the speed of said one member for shifting said second valve to a different position for connecting said pump and motor when the speed of said one member increases to a predetermined value.

13. In a system for controlling the engagement of a friction clutch adapted to connect a pair of relatively rotatable shafts, the combination of a fluid pressure actuated motor for engaging said clutch, a fluid pump driven by one of said shafts for supplying a fluid pressure for actuating said motor, a fluid pressure transmitting line connecting said pump and motor, a first valve normally biased to a position blocking fluid flow from said pump to said motor, a second valve normally biased to a position blocking fluid flow from said pump to said motor, depressible means controlling said first valve for shifting the first valve to a different position for connecting said pump and said motor, a centrifugal governor responsive to the speed of rotation of said one shaft for providing a fluid pressure which varies in accordance with said speed, and means for applying said last-mentioned fluid pressure to said second valve for shifting said valve to a different position so as to connect said pump and motor and thereby cause engagement of said clutch when the speed of said one shaft increases to a predetermined value.

14. In a system for controlling the engagement of a friction clutch disposed between a pair of shafts leading from the driving engine and to the transmission of an automotive vehicle, the combination of a fluid pressure actuated motor for engaging said clutch, a fluid pump driven by one of said shafts for supplying a fluid pressure for actuating said motor, a fluid pressure transmitting line connecting said pump and motor, a first valve normally biased to a position blocking fluid flow from said pump to said motor, a second valve normally biased to a position blocking fluid flow from said pump to said motor, an accelerator pedal for controlling the speed of the driving engine and effective upon depression for controlling said first valve for shifting the first valve to a different position for connecting said pump and motor, a centrifugal governor responsive to the speed of rotation of said one shaft for providing a fluid pressure which varies in accordance with said speed, and means for applying said last-mentioned fluid pressure to said second valve for shifting said valve to a different position so as to connect said pump and motor and thereby cause engagement of said clutch when the speed of said one shaft increases to a predetermined value for thereby facilitating starting of the driving engine of the vehicle by pushing the vehicle.

15. In combination, a drive shaft adapted to be driven by the driving engine of an automobile, a driven shaft, a friction clutch engageable for drivingly connecting said shafts, a fluid pressure operated motor for engaging said clutch, a pump driven by said drive shaft for supplying fluid under pressure, a pump driven by said driven shaft for supplying fluid under pressure, fluid transmitting means interconnecting said pumps and said motor, a first valve means adapted to be controlled by an operator of the automobile and disposed in said fluid pressure transmitting means and positionable for establishing fluid pressure communication between said first pump and said motor upon actuation of said first valve means, and other valve means operable in response to the speed of rotation of one of said shafts for establishing fluid pressure communication between said second pump and said motor above a predetermined speed of the shaft, whereby said second pump is effective to maintain the clutch engaged above said predetermined speed of the one shaft irrespective of the position of said first valve means.

16. In combination, a drive shaft adapted to be driven by the driving engine of the automoblie, a driven shaft, a friction clutch engageable for drivingly connecting said shafts, a fluid pressure operated motor for engaging said clutch, a pair of pumps respectively driven by said drive and driven shafts for supplying fluid pressure for operating said motor for effecting engagement of said clutch, a first valve means normally effective to block the fluid pressure supplied by said driven shaft operated pump and effective to maintain said clutch engaged at speeds of said driven shaft above a predetermined value, and other valve means adapted to be manipulated by an operator of the automobile and normally effective to block the fluid pressure from the drive shaft operated pump and effective in response to manipulation of the other valve means for establishing fluid communication between said drive shaft operated pump and said motor to effect engagement of said clutch.

17. In a system for controlling the operation of a clutch disposed between the driving engine and transmission of an automotive vehicle, the combination of a fluid pressure actuated motor for effecting engagement of said clutch, a source of fluid pressure for actuating said motor, an accelerator for controlling the speed of the driving engine of the vehicle and depressible from an idling position toward an open throttle position, valve means interconnected with said accelerator for controlling the supply of fluid pressure from said source to said motor for thereby controlling the engagement of said clutch, fluid pressure regulating valve means for controlling the pressure of the fluid supplied by said source to said motor, and means responsive to the speed of the vehicle for controlling said pressure regulating valve means so as to proportionately decrease the fluid pressure supplied to said motor as the speed of the vehicle increases.

18. In a system for controlling the engagement of a friction clutch disposed between the driving engine and transmission of a motor vehicle, the combination of a fluid pressure operated motor for effecting engagement of said clutch, a source of fluid pressure for operating said motor, an accelerator for the vehicle, regulating valve means for regulating the pressure of the fluid supplied to said motor, and means responsive to the speed of the vehicle and to the depression of said accelerator for acting on said regulating valve means so as to vary the pressure of the fluid supplied to said motor directly with accelerator depression and inversely with increases in the speed of the vehicle.

19. In a system for controlling the engagement of a friction clutch disposed between the driving engine and transmission of an automotive vehicle, the combination of a fluid pressure operated motor for effecting engagement of said clutch, a source of fluid pressure for operating said motor, regulating valve means for controlling the pressure of the fluid supplied to said motor, an accelerator for the vehicle depressible from an idling position to an open throttle position to thereby control the speed of the driving engine, means responsive to the depression of said accelerator and acting on said regulating valve means for causing the latter to vary the pressure of the fluid supplied to said motor directly with the degree of depression of said accelerator, and means responsive to the speed of the vehicle for acting on said regulator valve means for causing the latter to vary the pressure of the fluid applied to said motor inversely as the speed of the vehicle increases.

20. In a control device for a clutch operatively disposed between the driving engine and change speed transmission of an automotive vehicle, the combination of a manually operable selector lever movable to different positions for selectively establishing different drives through said transmission, a fluid pressure operated motor for effecting engagement of said clutch, a source of fluid pressure for actuating said motor, means defining a fluid circuit interconnecting said fluid source and said motor, a valve disposed in said fluid circuit for controlling the supply of fluid pressure to said motor and the engagement of said clutch, a solenoid for controlling said valve and effective to move said valve upon being energized for disconnecting said fluid source from said motor, an energizing circuit for said solenoid, and said selector lever including means defining an electric switch disposed in said circuit and operable at will for thereby actuating said valve to cut off the supply of fluid pressure for said motor and to relieve the fluid pressure in said motor for effecting disengagement of said clutch to facilitate the selection of a different drive through said transmission on a subsequent selective movement of said selector lever.

References Cited in the file of this patent

UNITED STATES PATENTS

| | | |
|---|---|---|
| Re. 20,792 | Gillett | July 12, 1938 |
| 1,592,176 | Brown | July 13, 1926 |
| 2,130,848 | Kliesrath | Sept. 20, 1938 |
| 2,275,204 | Smirl | Mar. 3, 1942 |
| 2,640,373 | Jandasek | June 2, 1953 |